(12) United States Patent
Case et al.

(10) Patent No.: US 10,482,258 B2
(45) Date of Patent: Nov. 19, 2019

(54) METHOD FOR SECURING RUNTIME EXECUTION FLOW

(71) Applicant: NXP USA, Inc., Austin, TX (US)

(72) Inventors: Lawrence Loren Case, Austin, TX (US); Aditi Dinesh Shah, Austin, TX (US)

(73) Assignee: NXP USA, INC., Austin, TX (US)

( * ) Notice: Subject to any disclaimer, the term of this patent is extended or adjusted under 35 U.S.C. 154(b) by 209 days.

(21) Appl. No.: 15/719,637

(22) Filed: Sep. 29, 2017

(65) Prior Publication Data

US 2019/0102556 A1    Apr. 4, 2019

(51) Int. Cl.
| | | |
|---|---|---|
| G06F 15/177 | (2006.01) |
| G06F 21/57 | (2013.01) |
| H04L 9/32 | (2006.01) |
| H04L 9/14 | (2006.01) |
| G06F 9/4401 | (2018.01) |
| G06F 1/24 | (2006.01) |

(52) U.S. Cl.
CPC .......... *G06F 21/575* (2013.01); *G06F 9/4406* (2013.01); *H04L 9/14* (2013.01); *H04L 9/3226* (2013.01); *G06F 1/24* (2013.01)

(58) Field of Classification Search
CPC ....... G06F 21/575; G06F 9/4406; H04L 9/14; H04L 9/3226
USPC .......................................................... 713/2
See application file for complete search history.

(56) References Cited

U.S. PATENT DOCUMENTS

| | | | | |
|---|---|---|---|---|
| 8,601,170 B1* | 12/2013 | Marr | ..................... | G06F 21/572 710/15 |
| 8,738,932 B2 | 5/2014 | Lee | | |
| 9,530,009 B2 | 12/2016 | Aissi | | |
| 2002/0078378 A1* | 6/2002 | Burnett | ................... | G06F 21/31 726/18 |
| 2003/0229791 A1* | 12/2003 | De Jong | ................ | G06F 21/31 713/182 |
| 2004/0158742 A1* | 8/2004 | Srinivasan | ............. | G06F 21/10 726/4 |
| 2005/0144476 A1* | 6/2005 | England | ............... | G06F 9/4405 726/17 |
| 2007/0067617 A1* | 3/2007 | Tarkkala | ............... | G06F 21/575 713/2 |
| 2008/0092145 A1 | 4/2008 | Sun | | |

(Continued)

FOREIGN PATENT DOCUMENTS

| | | |
|---|---|---|
| WO | 2010041467 A2 | 4/2010 |
| WO | 2010041467 A3 | 4/2010 |

*Primary Examiner* — Jaweed A Abbaszadeh
*Assistant Examiner* — Volvick Derose

(57) ABSTRACT

A runtime security system, including: a shared core configured to execute processes having varying levels of trustworthiness configured to receive security services requests; an execution monitor configured to monitor the execution of the shared core further comprising a timer, a policy table, and an execution monitor state machine; secure assets including cryptographic keys; and immutable security service functions configured to enable access to the secure assets in response to secure services requests; wherein the execution monitor is configured to: detect that the shared core has received a secure boot request; verify that the secure boot request is valid; allow the shared core to securely boot when the secure boot request valid.

16 Claims, 3 Drawing Sheets

(56) References Cited

U.S. PATENT DOCUMENTS

| | | | |
|---|---|---|---|
| 2008/0148064 A1* | 6/2008 | Challener | G06F 21/57 |
| | | | 713/189 |
| 2010/0082679 A1* | 4/2010 | Ekberg | G06F 21/6218 |
| | | | 707/783 |
| 2011/0167503 A1* | 7/2011 | Horal | G06F 21/10 |
| | | | 726/33 |
| 2011/0302638 A1* | 12/2011 | Cha | G06F 21/57 |
| | | | 726/6 |
| 2012/0066499 A1* | 3/2012 | Ali | G06F 21/305 |
| | | | 713/170 |
| 2012/0096450 A1* | 4/2012 | Schaefer | G06F 21/572 |
| | | | 717/168 |
| 2013/0097626 A1* | 4/2013 | Rajagopal | H04N 21/2541 |
| | | | 725/25 |
| 2014/0196127 A1* | 7/2014 | Smeets | H04L 63/0815 |
| | | | 726/5 |
| 2014/0282819 A1* | 9/2014 | Sastry | G06F 21/57 |
| | | | 726/1 |
| 2014/0351571 A1* | 11/2014 | Jacobs | G06F 21/575 |
| | | | 713/2 |
| 2015/0007262 A1* | 1/2015 | Aissi | G06F 21/60 |
| | | | 726/2 |
| 2015/0012737 A1* | 1/2015 | Newell | G06F 21/575 |
| | | | 713/2 |
| 2015/0248306 A1* | 9/2015 | Dawson | G06F 9/465 |
| | | | 718/1 |
| 2015/0310231 A1 | 10/2015 | Lin | |
| 2015/0365436 A1* | 12/2015 | Shenefiel | H04L 63/20 |
| | | | 726/1 |
| 2017/0364685 A1* | 12/2017 | Shah | G06F 21/53 |
| 2018/0121644 A1* | 5/2018 | Baker | G06F 21/51 |

* cited by examiner

METHOD FOR SECURING RUNTIME EXECUTION FLOW

TECHNICAL FIELD

Various exemplary embodiments disclosed herein relate generally to a method for controlling and monitoring execution flow to assure security sensitive functionality such that authenticate, attestation, and key management are protected.

BACKGROUND

In prior systems, a reset secure boot provides the most assurance that an "immutable", fully deterministic instruction sequence will be executed as intended. This immutable process is the root-of-trust from which the system securely establishes the runtime environment. Thus code authentication, integrity measurements, and high value crypto key installation are performed at this "high assurance" time right after reset. But this means the security state of the firmware, keys, etc. must be installed early and powered until the chip is powered off. This can be costly in power consumption, especially in the case where higher performing but power leaky cells are used for high throughput cryptographic accelerators.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to runtime security system, including: a shared core configured to execute processes having varying levels of trustworthiness configured to receive security services requests; an execution monitor configured to monitor the execution of the shared core further comprising a timer, a policy table, and an execution monitor state machine; secure assets including cryptographic keys; and immutable security service functions configured to enable access to the secure assets in response to secure services requests; wherein the execution monitor is configured to: detect that the shared core has received a secure boot request; verify that the secure boot request is valid; allow the shared core to securely boot when the secure boot request valid.

Various embodiments are described, wherein the execution monitor is further configured to set a timer related to an expected reaction time of the shared core to the secure boot request.

Various embodiments are described, wherein the execution monitor is further configured to monitor an entry point of an instruction sequence of the non-maskable secure boot request.

Various embodiments are described, wherein the execution monitor is further configured to: detect that the shared core has received a non-maskable secure services request; verify that an instruction related to the non-maskable secure services request is valid; and setting the privilege level of the instruction based upon a policy evaluation using the policy table.

Various embodiments are described, wherein the execution monitor is further configured to revert the privilege level to a different trust level once the non-maskable secure services request has been completed.

Various embodiments are described, wherein the execution monitor is further configured to set a timer related to an expected reaction time of the shared core to the non-maskable secure services request.

Various embodiments are described, wherein the shared core receives security assets based upon the set privilege level.

Further various embodiments relate to a runtime security system, including: a shared core configured to execute processes having varying levels of trustworthiness configured to receive security services requests; an execution monitor configured to monitor the execution of the shared core further comprising a timer, a policy table, and an execution monitor state machine; secure assets including cryptographic keys; and immutable security service functions configured to enable access to the secure assets in response to secure services requests; wherein the execution monitor is configured to: detect that the shared core has received a non-maskable secure services request; verify that an instruction related to the non-maskable secure services request is valid; and setting the privilege level of the instruction based upon a policy evaluation using the policy table.

Further various embodiments relate to a method of monitoring a shared core configured to perform functions having varying levels of trustworthiness by an execution monitor, wherein the execution monitor includes a timer, a policy table, and an execution monitor state machine, including: receiving a secure boot request by a shared core; detecting, by the execution monitor, that the shared core has received a secure boot request; and verifying that the secure boot request is valid; allowing the shared core to securely boot when the secure boot request valid.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Increasingly with internet of things (IoT) applications, security checks are needed "on demand" e.g., to have a device assuredly attest to the integrity of itself when the request is from a remote network management server.

In heterogeneous multi-core chips, many of the cores may be running somewhat unsecure software but connect to external entities that need to assuredly authenticate the device. Fault injection attacks are on the rise as products are now available to make it easy for fine-grained control of such attacks. Without monitoring, an instruction sequence may "skip" a critical security step, undetected.

As a result there is a need for a practical method for a secure run time execution flow stemming from a root-of-trust with monitoring that meets or exceeds the same assurances as the boot time flow to perform code authentication, code measurement (attestation), signatures, and crypto key installation.

The techniques and embodiments described herein demonstrate how a root of trust is used to initiate security functions in the runtime when needed to save power and lessen risk of exposure or modification of sensitive information and controls. These embodiments allow for sharing of an off-the-shelf microcontroller core with non-secure software for low cost, resource-constrained devices.

Figure 1:
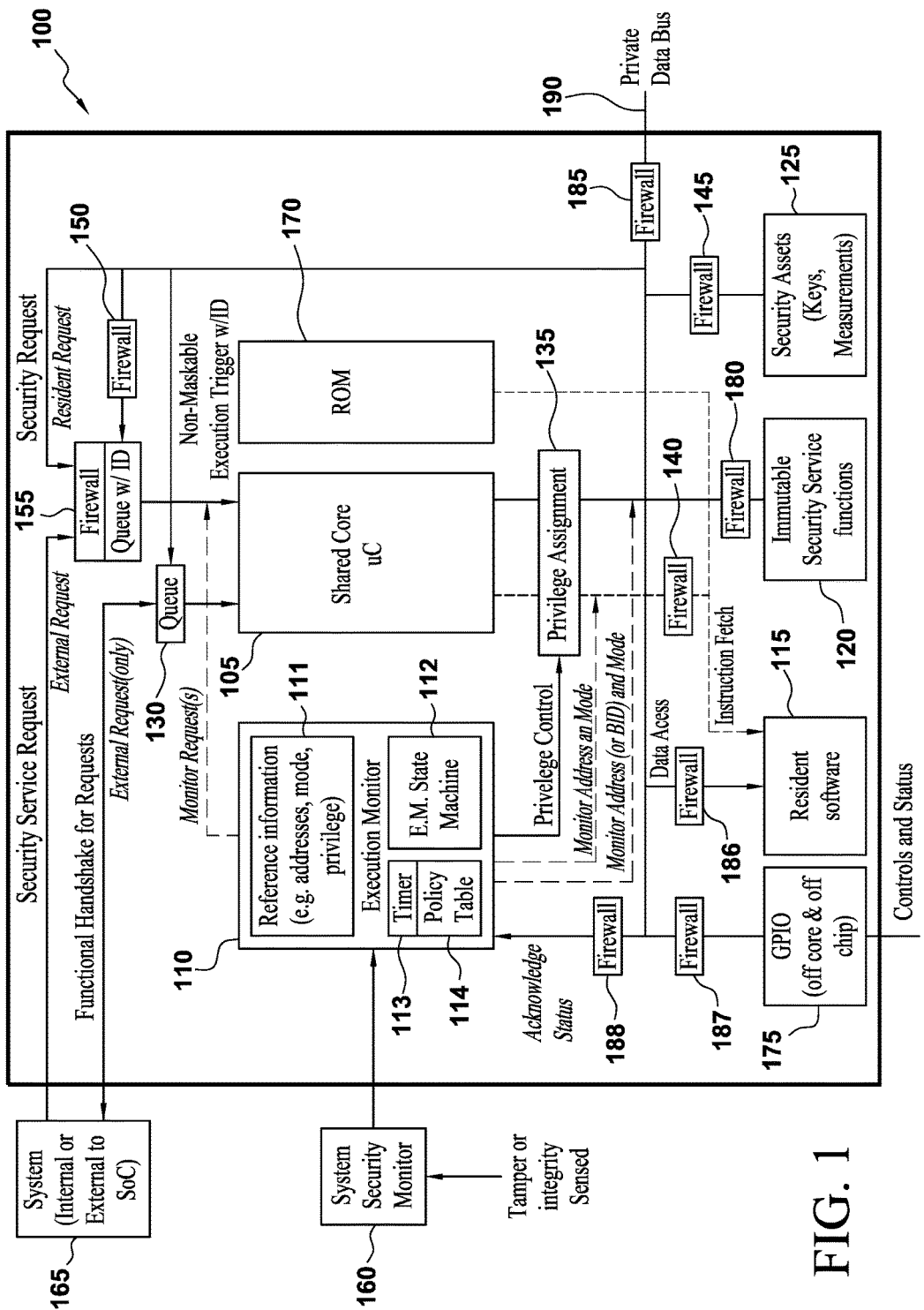
FIG. 1 illustrates an embodiment of a secure runtime system.

FIG. 1 illustrates an embodiment of a secure runtime system. The secure runtime system 100 may include a shared core microcontroller 105, an execution monitor 110, resident software 115, immutable security service functions 120, security assets 125, a handshaking queue 130, privilege assignment function 135, a queue with/ID 155, read only memory (ROM) 170, general purpose input/output (GPIO) 175, private data bus 190, and firewalls 140, 145, 150, 180, 185, 186, 187, and 188. The secure runtime system 100 may communicate with a system 165 that sends security service requests to the secure runtime system 125. The system 165 may be internal or external to a system on chip (SoC) that includes the secure runtime system 100. A system security monitor 160 may also receive indications of tampering or integrity issues and provide an integrity monitor signal to the execution monitor 110. The secure runtime system may also be called a runtime root of trust system.

The execution monitor 110 may include reference information 111, an execution monitor state machine 112, a timer 113, and a policy table 114. The execution monitor 110 monitors critical signals and sets specific access privilege to security assets. The execution monitor 110 will be described in more detail below. The execution monitor 110 may be implemented in hardware. Such hardware implementation may include configurable hardware and may include memory and a controller.

The shared core 105 may be a microcontroller that allows both application code with varying levels of trustworthiness and trusted security services. The shared core 105 may be any type of processor including a microprocessor. The shared core 105 may be low cost device that is used in cost sensitive application where security is still an important requirement. The shared core 105 also may be an unsecured processor. Associated with the shared core 105 is ROM 170.

The ROM 170 stores code that are immutable instructions. The resident software 115 may fetch instructions from the ROM 170.

The immutable security service functionally 120 includes functions that enable access to security assets 125 when entered properly. The immutable security service functionality 120 will typically be implemented using secure hardware. The security assets 125 are a protected area with confidentiality and integrity critical parameters, e.g., cryptographic keys, with access controls aligned to the execution monitor privilege enumeration. The security assets 125 provide the secure information in response to requests for a specific security asset. The immutable security service functionality 120 and the security assets 125 may be behind firewalls 140 and 145. The firewalls 140 and 145 allow for only authorized access via security service requests to either the immutable security service functionality 120 or the security assets 125.

The queue w/ID 155 receives security service requests and then provides authorized security service requests to the shared core 105. Security service requests provide non-maskable requests to the shared core 105. This access is protected and the identity of what made the request is captured on the bus. This identity is not set by the requesting software but from the underlying source channel input (e.g., core, I/O, privilege mode).

The privilege assignment function 135 assigns the privileges associated to requests from the shared core 105 to access the immutable security service functions 120, security assets 125, resident software 115, and the private bus 190. The privilege assignment function 135 is controlled by the execution monitor 110.

The private bus 190 provides for external access to the secret information. This bus is protected by a firewall 185 that screens the incoming requests. Further, a firewall 186 controls the access to the resident software 115 by the private bus 190. A firewall 188 controls the access to the execution monitor 110 by the private bus 190.

The GPIO provides the ability to have a general input/output access to the secure runtime system 100. It allows for communication with other systems that are off core and off chip. A firewall 187 controls the access to the private bus 190 by the GPIO 175.

The operation of the secure runtime system 100 will now be described.

The system 165 indicates to a resident process (not security service) running on the shared core 105 via handshaking queue 130 that a security service request will be sent shortly to the shared core 105. Alternatively, a resident process running on the shared core 105 may make a security service request.

The resident process executing on the shared core then saves its state and sends back to the system 165 via the handshaking queue 155 an acknowledgement that shared core is ready to receive the security service request. If the resident process does not behave properly in response to the handshake protocol, then the system 165 may directly interrupt the misbehaving resident process, and then the resident process may be re-authenticated and run via security service call, re-booted in the runtime without a reset.

The system 165 then sends the security service request to the queue w/ID 155. A source identity (ID) is transferred along with the request message and captured in the queue w/ID 155. The queue w/ID 155 also includes a firewall that rejects requests from unauthorized sources. For an authorized requesting source, the identity is used to apply access and services policies in the service monitor 110.

The queue w/ID 155 sends a non-maskable request to the shared core 105. The non-maskable request triggers/forces execution of the shared core 105 to an immutable command handler, e.g., non-maskable interrupt (NMI) handler in ROM.

The execution monitor detects the trigger, changes the state of the EM state machine 112 to a first state, captures the requestor's ID, and sets the timer to a time related to an expected reaction time of the shared core 105 to non-maskable request.

The shared core 105 fetches an immutable instruction from the request handler e.g., from ROM. In the request handler is an instruction to send an acknowledgement of the request to the execution monitor 110.

The execution monitor 110 detects the instruction fetch to the exact location of the command handler address. This causes the EM state machine 112 to advance to the second state, and the execution monitor 110 resets the timer 113 that was awaiting the acknowledgement.

The request handler process sends the expected acknowledgement which causes the EM state machine 112 to advance to a third state, and the execution monitor 110 restarts the timer.

At this point the checks have occurred as expected and a single security service invocation will be given privilege by the execution monitor 110 based on the ID and a policy evaluation by the execution monitor 110 to allow the shared core 105 to access specific security assets (e.g., keys, measurements, functions). The privilege is granted by setting the shared core privilege assignment value. The immutable security service function executes on the shared core 105, and other requests or signals cannot alter the execution flow of the shared core 105 or instruction pointer. Privileges are set so that instructions cannot be fetched from functions with various levels of trustworthiness.

If there are multiple security services with corresponding privileges (not necessarily hierarchical) the execution monitor 110 detects the instruction to the specific command address and awaits acknowledgement as each command has its own acknowledgment. The shared core 105 awaits receiving the status.

The execution monitor 110 verifies the command according to policy and requestor ID. Policy permitting, the execution monitor 110 adjusts the privilege assignment and sets the status.

The shared core 105 receives status and accesses security assets 125.

Once the shared core immutable process is complete, the shared core 105 sends a final acknowledgement to the execution monitor 110. The execution monitor 110 then reverts the privilege assignment 135 to the previous trust level and resets the execution monitor state machine 112.

Figure 2:
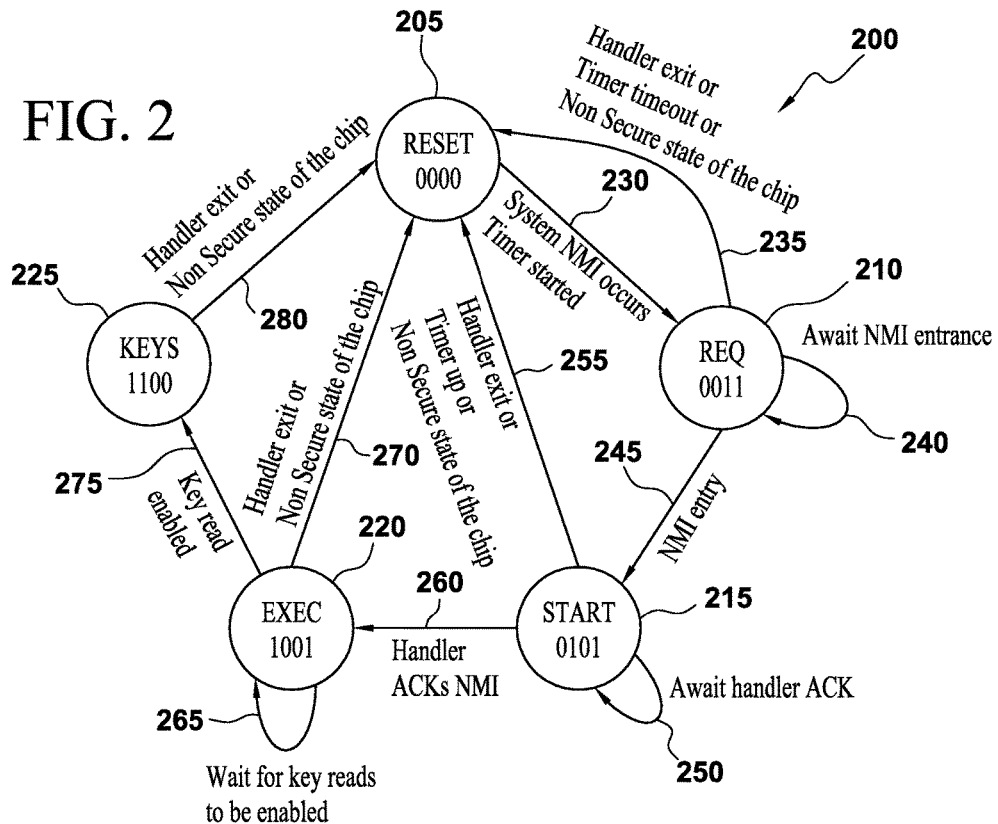
FIG. 2 illustrates the state transition diagram for the execution monitor state machine.

The operation of the execution monitor state machine 112 will now be described. FIG. 2 illustrates the state transition diagram for the execution monitor state machine 112. The execution monitor state machine 112 includes the following states: RESET 205; REQ 210; START 215; EXEC 220; and KFYS 225.

At the RESET state 205, a non maskable interrupt is issued to the secure core 105. This causes the secured core 105 to jump execution to the ROM address space. This address is a hardcoded value and cannot be changed.

When a system non-masked interrupt (NMI) occurs, the execution monitor state machine 112 transitions 230 to the REQ state. Also, the timer 113 is started by the execution monitor 110. Once this NMI is received, the execution monitor 110 snoops the address lines of the ROM and looks for an address match on the handler address being executed. In the REQ state 210, if there is a handler exit, a timer timeout, or the shared core enters a non-secure state, then the execution monitor state machine 112 transitions 235 back to the RESET state 205. Otherwise, the execution monitor state machine 112 awaits an NMI entrance 240. Once there is an NMI entry 245 due to an instruction fetch at a specific address (i.e., an address match), the execution monitor state machine 112 transitions 245 to the START state 215.

In the START state 215, once the handler execution starts, the handler acknowledges that it seeks access to the security assets 125. In the START state 215, if there is a handler exit, a timer timeout, or the shared core enters a non-secure state, then the execution monitor state machine 112 transitions 255 back to the RESET state 205. Otherwise, the execution monitor state machine 112 awaits a handler acknowledgement 250. The execution monitor 110 will not receive inputs through this port until the first states have successfully completed. Once the handler acknowledges the NMI, the execution monitor state machine 112 transitions 260 to the EXEC state 220.

In the EXEC state 220, a specific service such as key reads is requested by an immutable execution command. In the EXEC state 220, if there is a handler exit or the shared core enters a non-secure state, then the execution monitor state machine 112 transitions 270 back to the RESET state 205. Otherwise, the execution monitor state machine 112 waits for key reads to be enabled 265. Once the key read is enabled, the execution monitor state machine 112 transitions 275 to the KEYS state 225.

In the KEYS state 220, once the core is done reading the keys, it exits this NMI process. In the KEYS state 225, if there is a handler exit or the shared core enters a non-secure state, then the execution monitor state machine 112 transitions 280 back to the RESET state 205.

Figure 3:
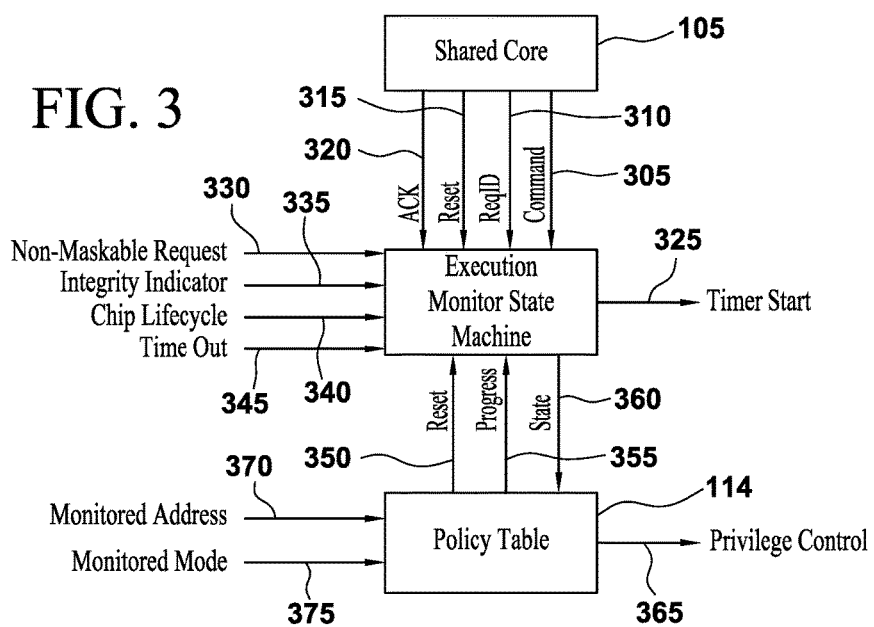
FIG. 3 illustrates the interaction between the execution monitor state machine and a policy table.

If at any time during the operation of the execution monitor state machine 112, the timer times out, a security breach, or policy failure occurs, the executions monitor state machine 112 resets, and a new request is needed to restart the process FIG. 3 illustrates the interaction between the execution monitor state machine 112 and a policy table. The execution monitor state machine 112 interacts with the shared core 105, policy table 114, and the timer 113. Only after a prescribed sequence of execution events and conditions can access be granted. The execution monitor state machine 112 is automatically initiated upon an allowed request event.

The policy table 112 provides privilege control 365 based on the state 360 of the execution monitor state machine 112, request ID 310, monitored address 370, monitored mode 375, and command 305. While the state 360 determines if access may be allowed (i.e., because the execution flow is verified), the privilege control 365 provides finer grain and separation in a multi-requestor system. Policy table 114 can progress 355 or reset 350 the execution monitor state machine 112, depending on policies defined in the policy table 114 based upon the various inputs.

A command is provided from the shared core 105 after a non-maskable request 330 is received and execution has begun, when the address has been checked. Therefore command 305 and request ID 310 are trusted values.

The shared core 105 may also send a reset 315 and ACK 320 to the execution monitor state matching 112. The execution monitor state machine 112 may also receive an integrity indicator 335, chip lifecycle value 340, and a time out indicator 345.

Figure 4A:
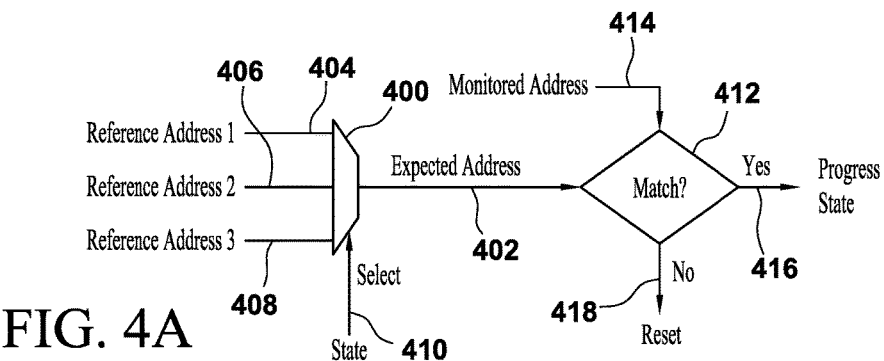
FIGS. 4A, 4B, and 4C illustrate logic used for policy checking by the execution monitor.
Figure 4B:
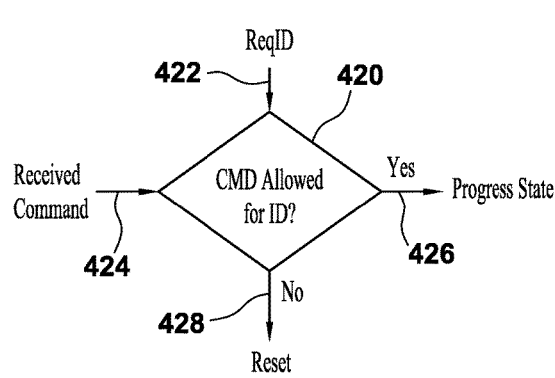
Figure 4C:
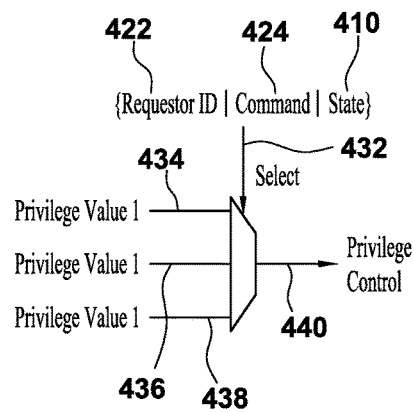

FIGS. 4A, 4B, and 4C illustrate logic used for policy checking by the execution monitor 110. As shown in FIG. 4A, the execution monitor 112 checks the instruction address (monitored address) against an expected address, which may change depending on the state of the execution monitor state machine 112. Further, the state may be in part dependent upon the command. More specifically, a selector 400 may receive a reference address 1 404, a reference address 2 406, up to a reference address N 408, and the state of the execution monitor state machine 112. One of the reference addresses (404, 406, and 408) is selected based upon the state to produce an expected address 402. Next, a comparator 412 received the expected address 402 and a monitored address 414 and determines if they match. If they do match, then the state of the execution monitor state machine 112 is progressed 416. If they do not match, then the execution state machine 112 is reset 418.

As shown in FIG. 4B the requestor is checked. The shared core 105 provides the requestor's ID 422 and the received command 424 and it is determined if the received command 424 is allowed for the requestor 420. If the requestor is allowed to request the specified command, then the state of the execution monitor state machine 112 is progressed 426. If the command is not allowed, then the execution state machine 112 is reset 420. The requestor's ID 422 and the received command 424 are trusted at this check.

FIG. 4C illustrated how the privilege control may be determined. The privilege control 440 depends on the execution monitor state, the command, and the requester's ID. For example, if the state 410 and command 424 are the same, different requester's ID 422 might result in different access permissions or locations. Privilege control 440 is a temporary window of access until the shared core 105 exits the immutable sequence and resets the state. A selector 430 may receive privilege values 1-N 434, 436, 438. The selector 440 also received the requestor ID 422, command 424, and state 410, and the selector 440 uses these inputs to select one of the privilege values 434, 436,438 as the privilege control 440.

Figure 5:
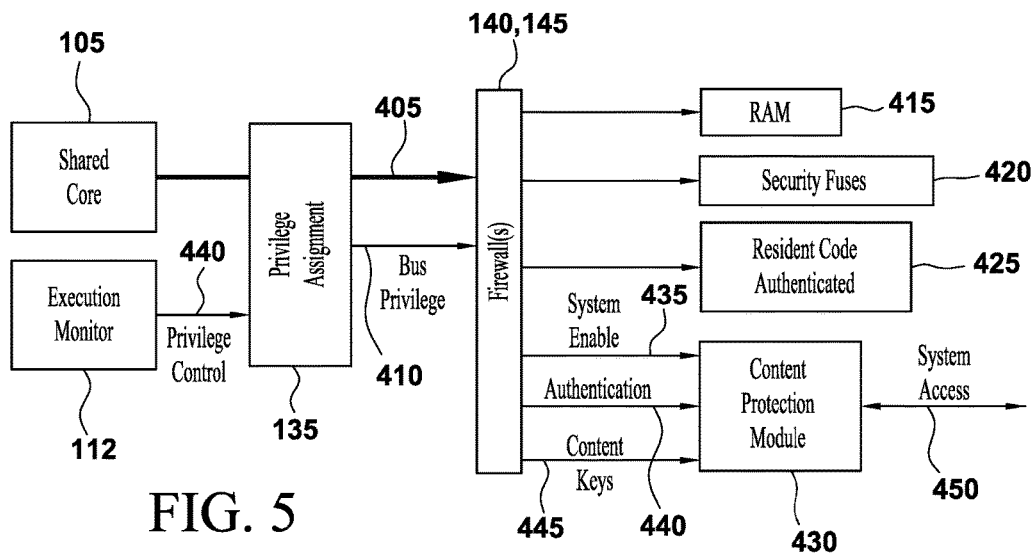
FIG. 5 illustrates the control of bus transaction privileges for accessing the security assets.

FIG. 5 illustrates the control of bus transaction privileges for accessing the security assets. The privilege assignment 135 receives requests from the shared core 105 and also a privilege control 440 from the execution monitor 112. Based upon this information, the privilege assignment 135 determines the bus privilege 410 for the requests from the shared core 105. The privilege assignment 15 send the request 405 and bus privilege 410 to the firewalls 140, 145. The firewall then enables access to the various elements of the security assets 125. The security assets may include RAM 415, security fuses 420, resident code authenticated 425, and content protection module 450. To access the content protection module 430, the firewalls 140, 145 may send a system enable 435, an authentication 440, and content keys 445. The content protection mode then grants system access 450 based upon these inputs.

The following table provides examples of how bus transaction privileges may be implemented. In this example there are six regions. For each of the regions specific privileged IDs are permitted as shown, and then the firewalled data to be accessed is defined.

| Firewall Region | Privileged IDs Permitted | Firewalled Data |
| --- | --- | --- |
| Region 1 | Internal network subsystem | Intranet authentication credentials. |
| Region 2 | Execution monitor code | Execution monitor authentication credentials (e.g., manufacturing protections) |
| Region 3, 4 | Authenticated reside code (verified as part of request command) | Security fuses, monotonic counter, resident secrets |
| Region 5 | Connectivity subsystem | Attestation function and registers (signed by execution monitor and ca include requestor ID) |
| Region 6 | Application subsystem has privilege to use but does not have visibility or direct control | Content protection module (controls, firmware authentication, and keys) |

The embodiments described herein provide a variety of benefits as follows. The embodiments described provide on-demand (i.e., as needed) security functions and cryptographic key access for low power. These functions are only provided power when needed. The embodiments also provide active monitoring for proper security function entry point. The embodiments provide separation of privilege between ROM, software code running on the same core, and the system. Further, cryptographic keys are only available during a narrow window of time, when needed, to lessen risk of exposure. Further, the embodiments use an off-the-shelf core, thus there is no need for special microcontroller.

The embodiments provide that the timing for flow from interrupt signal to execution of first code of the key management handler is deterministic. The embodiments described also provide robustness against fault injection attacks. These embodiments also allow for sharing of a small core for both security services and less trusted software for resource constrained devices, thus leading to a lower cost system.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory. Further, as used herein, the term "processor" will be understood to encompass a variety of devices such as microprocessors, field-programmable gate arrays (FPGAs), application-specific integrated circuits (ASICs), and other similar processing devices. When software is implemented on the processor, the combination becomes a single specific machine.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A runtime security system, comprising:
a shared core configured to execute processes having varying levels of trustworthiness configured to receive security services requests;
an execution monitor configured to monitor the execution of the shared core further comprising a timer, a policy table, and an execution monitor state machine; secure assets including cryptographic keys; and immutable security service functions configured to enable access to the secure assets in response to secure services requests, wherein the execution monitor is configured to:
detect that the shared core has received a secure boot request;
verify that the secure boot request is valid during a temporary window of access based upon a state of the execution monitor, a received command, and a requestor ID: and
allow the shared core to securely boot when the secure boot request is valid;
wherein the execution monitor is further configured to set the timer related to an expected reaction time of the shared core to the secure boot request.

2. The runtime security system of claim 1, wherein the execution monitor is further configured to monitor an entry point of an instruction sequence of the secure boot request.

3. The runtime security system of claim 1, wherein the execution monitor is further configured to:
detect that the shared core has received a non-maskable secure services request;
verify that an instruction related to the non-maskable secure services request is valid; and
set a privilege level of the instruction based upon a policy evaluation using the policy table.

4. The runtime security system of claim 3, wherein the execution monitor is further configured to revert the privilege level to a different trust level once the non-maskable secure services request has been completed.

5. The runtime security system of claim 3, wherein the execution monitor is further configured to set the timer related to an expected reaction time of the shared core to the non-maskable secure services request.

6. The runtime security system of claim 3, wherein the shared core receives security assets based upon the set privilege level.

7. A runtime security system, comprising:
a shared core configured to execute processes having varying levels of trustworthiness configured to receive non-maskable security services requests;
an execution monitor configured to monitor the execution of the shared core further comprising a timer, a policy table, and an execution monitor state machine; secure assets including cryptographic keys; and immutable security service functions configured to enable access to the secure assets in response to non-maskable secure services requests, wherein the execution monitor is configured to:
detect that the shared core has received a non-maskable secure services request;
verify that an instruction related to the non-maskable secure services request is valid during a temporary window of access based upon a state of the execution monitor, a received command, and a requestor ID: and
set a privilege level of the instruction based upon a policy evaluation using the policy table;
wherein the execution monitor is further configured to set the timer related to an expected reaction time of the shared core to the non-maskable secure services request.

8. The runtime security system of claim 7, wherein the execution monitor is further configured to monitor an entry point of an instruction sequence of the non-maskable secure services request.

9. The runtime security system of claim 7, wherein the execution monitor is further configured to revert the privilege level to a different trust level once the non-maskable secure services request has been completed.

10. The runtime security system of claim 7, further comprising:
a handshake queue configured to perform a handshake protocol with a system sending secure services requests to the shared core.

11. The runtime security system of claim 7, further comprising:
a queue with ID configured to receive security services requests and the requestor ID from a system and provide the security services requests to the shared core based upon the requestor ID.

12. The runtime security system of claim 7, further comprising:
a system security monitor configured to provide an integrity indicator to the execution monitor based upon a tamper or integrity issued indication.

13. A method of monitoring a shared core configured to perform functions having varying levels of trustworthiness by an execution monitor, wherein the execution monitor includes a timer, a policy table, and an execution monitor state machine, the method comprising:
receiving a secure boot request by a shared core;
detecting, by the execution monitor, that the shared core has received the secure boot request;
verifying that the secure boot request is valid during a temporary window of access based upon a state of the execution monitor, a received command, and a requestor ID: and
allowing the shared core to securely boot when the secure boot request is valid;
setting, by the execution monitor, the timer related to an expected reaction time of the shared core to the non-maskable secure services request.

14. The method of claim 13, further comprising:
receiving a non-maskable secure services request by the shared core;
detecting, by the execution monitor, that the shared core has received a non-maskable secure services request;
verifying, by the execution monitor, that an instruction related to the non-maskable secure services request is valid; and
setting, by the execution monitor, a privilege level of the instruction based upon a policy evaluation using the policy table.

15. The method of claim 14, wherein the shared core receives security assets based upon the set privilege level.

16. The method of claim 14, further comprising:
reverting, by the execution monitor, the privilege level to an un-trusted level once the non-maskable secure services request has been completed.

* * * * *